United States Patent
Bosley (10) Patent No.: US 6,348,148 B1
(45) Date of Patent: Feb. 19, 2002

(54) SEAWATER PRESSURE-DRIVEN DESALINIZATION APPARATUS WITH GRAVITY-DRIVEN BRINE RETURN

(76) Inventor: Kenneth R. Bosley, 2801 Briarwood La., Fredericksburg, VA (US) 22408-2066

( * ) Notice: Subject to any disclaimer, the term of this patent is extended or adjusted under 35 U.S.C. 154(b) by 0 days.

(21) Appl. No.: 09/716,230

(22) Filed: Nov. 21, 2000

Related U.S. Application Data (63) Continuation-in-part of application No. 09/287,658, filed on Apr. 7, 1999, now abandoned.

(51) Int. Cl.[7] .............................................. B01D 61/08
(52) U.S. Cl. ................. 210/170; 210/257.2; 210/416.3; 210/652
(58) Field of Search ................................ 210/651, 652, 210/747, 104, 137, 170, 242.1, 248, 321.66, 345, 416.1, 416.3, 321.6, 257.2, 358

(56) References Cited

U.S. PATENT DOCUMENTS

| | | |
|---|---|---|
| 3,171,808 A | 3/1965 | Todd |
| 3,456,802 A | 7/1969 | Cole |
| 4,125,463 A | 11/1978 | Chenoweth |
| 4,335,576 A | 6/1982 | Hopfe |
| 4,452,696 A | 6/1984 | Lopez |
| 4,770,775 A | 9/1988 | Lopez |
| 5,167,786 A | 12/1992 | Eberle |
| 5,229,005 A | 7/1993 | Fok et al. |
| 5,366,635 A | 11/1994 | Watkins |
| 5,914,041 A | 6/1999 | Chancellor |
| 5,916,441 A | 6/1999 | Raether |
| 5,944,999 A | 8/1999 | Chancellor et al. |

FOREIGN PATENT DOCUMENTS

GB  2 068 774  8/1981

OTHER PUBLICATIONS

Levenspiel et al., "The Osmotic Pump", Science, Jan. 1974, vol. 183, No. 4121, pp. 157–160.

*Primary Examiner*—Ana Fortuna
*Assistant Examiner*—Richard W. Ward
(74) *Attorney, Agent, or Firm*—Stephen Christopher Swift; Swift Law Office (57) ABSTRACT

An apparatus and method of removing salt from seawater to produce potable freshwater. In the preferred embodiments, a large metal cylinder, with open top and bottom ends, is anchored to the sea floor offshore. Several pressure hulls are attached to the side of the cylinder. Within each pressure hull there are several reverse osmosis devices (RODs), each containing a membrane that will allow water molecules, but not sodium and chlorine ions, to pass through. Due to the pressure differential, freshwater passes through the membranes by reverse osmosis, and is pumped out of the pressure hulls to a storage facility onshore. After equilibrium is reached, the pumps for the brine can be turned off, as gravity will cause brine to flow down from the pressure hulls through an opening in the bottom of the cylinder.

8 Claims, 7 Drawing Sheets

SEAWATER PRESSURE-DRIVEN DESALINIZATION APPARATUS WITH GRAVITY-DRIVEN BRINE RETURN

CROSS REFERENCE TO RELATED APPLICATION

This application is a Continuation-In-Part of Utility patent application Ser. No. 09/287,658, filed Apr. 7, 1999, now abandoned.

BACKGROUND OF THE INVENTION

1. Field of the Invention

The present invention relates to a reverse osmosis method of removing the salt from water in the ocean or inland bodies of salt water, using the pressure of the seawater itself, and the force of gravity.

2. Description of the Prior Art

Due to the shortage of freshwater in the southwestern United States and other arid parts of the world, there have been numerous inventions for desalinating sea water, by reverse osmosis, distillation, and other means. However, desalinization remains an expensive process. The concentrated brine produced as a by-product of desalinization can itself contribute to pollution of the environment in onshore facilities. The production of electricity or other forms of energy consumed in desalinization can also contribute to pollution of the air, water and land.

U.S. Pat. No. 3,171,808, issued on Mar. 2, 1965, to Henry W. Todd, discloses an apparatus for extracting fresh water from ocean salt water, using vanes that are not included in the present invention.

U.S. Pat. No. 3,456,802, issued on Jul. 22, 1969, to Marc Cole, discloses an apparatus for desalinization by submerged reverse osmosis, without the gravity-driven brine return of the present invention.

U.S. Pat. No. 4,125,463, issued on Nov. 14, 1978, to James W. Chenoweth, discloses a reverse osmosis desalinization apparatus and method, that is placed in a well hole for desalinating salty ground water.

U.S. Pat. No. 4,335,576, issued on Jun. 22, 1982, to Harold H. Hopfe, discloses a device for producing freshwater from seawater which floats on the surface of the sea. It derives the energy for desalinization from the motion of the waves on the surface of the water. Movement of the water on the surface causes reaction plates to move, and the movement is ultimately transmitted to pistons that move in cylinders to exert pressure on seawater to force reverse osmosis.

U.S. Pat. No. 4,452,969, issued on Jun. 5, 1984, to Fernand Lopez, discloses a reverse osmosis apparatus for producing freshwater from seawater, which is designed to be temporarily submerged, as on a fishing line. U.S. Pat. No. 4,770,775, issued on Sep. 13, 1988, to Fernand Lopez, discloses another apparatus for the production of freshwater from seawater, which is also designed to be temporarily submerged, and has a chamber that expands as freshwater is produced. Both of these apparatuses use the pressure of the seawater itself to force reverse osmosis.

U.S. Pat. No. 5,167,786, issued on Dec. 1, 1992, to William J. Eberle, discloses a wave power collection apparatus, which is anchored in the sea floor, and in one embodiment desalinates seawater by reverse osmosis. The movement of floats is used in that embodiment to turn a generator which produces electricity to power pumps that force seawater through a membrane in a reverse osmosis unit.

U.S. Pat. No. 5,229,005, issued on Jul. 20, 1993, to Yu-Si Fok and Sushil K. Gupta, discloses a process for the desalinization of seawater, by lowering reverse osmosis devices into the ocean by means of lines attached to pulleys, and raising them again by the same means to remove the freshwater produced. The pressure of the seawater itself is used to force reverse osmosis of the seawater across a membrane to produce freshwater.

U.S. Pat. No. 5,366,635, issued on Nov. 22, 1994, to Larry O. Watkins, discloses a desalinization apparatus and means in which a separator is placed on the sea floor, and the pressure at the sea floor is used to force seawater through a membrane to form freshwater by reverse osmosis, which is then pumped out.

U.S. Pat. No. 5,914,041, issued on Jun. 22, 1999, to Dennis H. Chancellor, discloses channel based reverse osmosis, in which reverse osmosis units are placed within a deep channel. The channel contains unpurified liquid (such as salt water) at a level such that the pressure across the membranes of the reverse osmosis units causes purified liquid (such as fresh water) to accumulate in cavities in the reverse osmosis units, from which it is emptied and pumped to the surface.

U.S. Pat. No. 5,916,441, issued on Jun. 29, 1999, to Roger J. Raether, discloses an apparatus for desalinating salt water in a mine shaft.

U.S. Pat. No. 5,944,999, issued on Aug. 31, 1999, to Dennis H. Chancellor, Marc Chancellor and Jacquetta M. Vogel, discloses a modular filtration system, in which the weight of the fluid being filtered is used to drive the filtration process.

British Patent No. 2,068,774, published on Aug. 19, 1981, to Jose Luis Ramo Mesple, discloses an apparatus for desalinating water by reverse osmosis in cells located deep underground, utilizing the pressure resulting from the water being deep underground.

*The Osmotic Pump*, by Octave Levenspiel and Noel de Nevers, Science, January 1974, Volume 183, Number 4121, pages 157–160, discloses the idea of using the weight of sea water to drive a desalinization process, but does not disclose the structures and mechanisms of the present invention.

The present invention is distinguishable from the prior art cited, in that only it takes advantage of the fact that the concentrated brine produced as a by-product of reverse osmosis desalinization is heavier than seawater to reduce the energy consumed in desalinization, by means of a gravity-driven brine return. None of the above inventions and patents, taken either singly or in combination, will be seen to describe the present invention as claimed.

SUMMARY OF THE INVENTION

The present invention is an apparatus and method of removing salt from seawater to produce potable freshwater. In the first three preferred embodiments, a large metal cylinder, with open top and bottom ends, is anchored to the floor of the ocean (or inland sea) offshore. Several pressure hulls are attached to the side of the cylinder. The interior of each pressure hull is maintained at about one atmosphere of pressure, but the hulls are submerged at a depth at which the ambient water pressure is several atmospheres. Within each pressure hull there are several reverse osmosis devices ("RODs"), each containing a membrane that will allow water molecules, but not sodium and chlorine ions, to pass through. Check valves allow sea water to pass from outside the hulls into the RODs. Due to the pressure differential, water molecules pass through the membranes by reverse osmosis, while salt is left behind, and freshwater is pumped out of the pressure hulls to a storage facility on shore (or where ever else it is needed). Initially, the seawater remaining on the other side of the membrane, which has a greatly increased concentration of salt due to water passing through the membrane, is pumped into the cylinder. (The water with an increased concentration of salt is hereinafter referred to as "brine".) After an initial surge, the level of the brine in the cylinder will eventually reach equilibrium, at a height below the height of the seawater outside the cylinder, due to the greater weight of the brine compared to unconcentrated seawater. After equilibrium is reached, the pumps for the brine can be turned off, as gravity will cause it to flow down from the pressure hulls through an opening near the bottom of the cylinder. This will reduce the energy needed to desalinate seawater. (It will still be necessary to pump out the freshwater.)

In the fourth preferred embodiment, a reverse osmosis system containing one or more RODs is supported by a platform on the sea floor, and there is no cylinder. In the fifth preferred embodiment, the cylinder is supported by a flotation device, and the reverse osmosis system is retained on the cylinder. In both the fourth and fifth embodiments, an elongated brine return runs downhill on the sea floor.

Accordingly, it is a principal object of the invention to provide a means for reducing the energy required to desalinate seawater. Conventional desalinization plants, located on or near the seashore, require four pumping processes: first, pumping the seawater to the plant; second, pumping to raise the pressure high enough for the RODs to operate; third, pumping the brine back out to sea; and fourth, pumping the freshwater to a reservoir or a treatment facility for further purification, and ultimately to the consumer. The present invention eliminates all but the fourth pumping process. While prior inventions of offshore desalinization apparatus, as in U.S. Pat. No. 5,366,635 to Watkins, will also eliminate the first and second processes, only the instant invention will also eliminate the third process of pumping out the brine, without requiring that energy be expended in raising the RODS, as in U.S. Pat. No. 4,452,969 to Lopez and U.S. Pat. No. 5,229,005 to Fok et al.

It is second object of the invention to provide a means for reducing the need for using expensive real estate on or near the oceanfront for desalinization facilities. As no oceanfront or near-oceanfront property is used exclusively for the process, most real estate costs associated with desalinization plants can be avoided. Some offshore site leasing may be required, but this cost should be much lower than for offshore sites involved in petroleum or mineral extraction.

It is a third object of the invention to provide a means for making the expansion of desalinization facilities easier and less expensive. As each platform must have a clear navigation zone around it (as most jurisdictions require by law), sufficient space for attaching additional pressure hulls to the cylinder will be available and facility expansion considerably eased. The expansion of a facility is limited only by the number of pressure hulls that can be fitted onto the cylinder at appropriate depths, rather than allowances made by a zoning commission with many other constituents to satisfy, as may the case with a land-based desalinization facility.

It is a fourth object of the invention is to provide a means for reducing the cost of desalinizing seawater by centralizing maintenance facilities, as the pressure hulls can be removed and taken to a central facility for maintenance, rather than the on-site maintenance required by conventional shore-based desalinization plants.

It is a fifth object of the invention to reduce pollution of the shoreline from the release of concentrated brine by desalinization plants. Conventional onshore desalinization facilities pump their brine out to sea through a bottom-laid pipeline, which releases the brine on or near the ocean floor. Releasing the brine near the ocean floor increases the area affected by the brine's toxicity. Existing methods to reduce the toxic effects add to the cost of desalinization through greater plant infrastructure requirements or reduced process efficiency.

The present invention allows an offshore desalinization facility to release its brine into mid-water, where mixing with the ocean current is more efficient, with fewer effects upon bottom-dwelling flora and fauna. Because the facility can be located offshore, ocean currents and tidal action will thoroughly mix the brine back into the surrounding seawater, and the overall impact of increased salinity from the brine release could be infinitesimal as little as two or three kilometers down-current.

It is an object of the invention to provide improved elements and arrangements thereof in an apparatus for the purposes described which is cost effective, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an apparatus and method of removing salt from seawater to produce potable fresh water. It may be used in either the oceans or in inland bodies of salt water.

Figure 1:
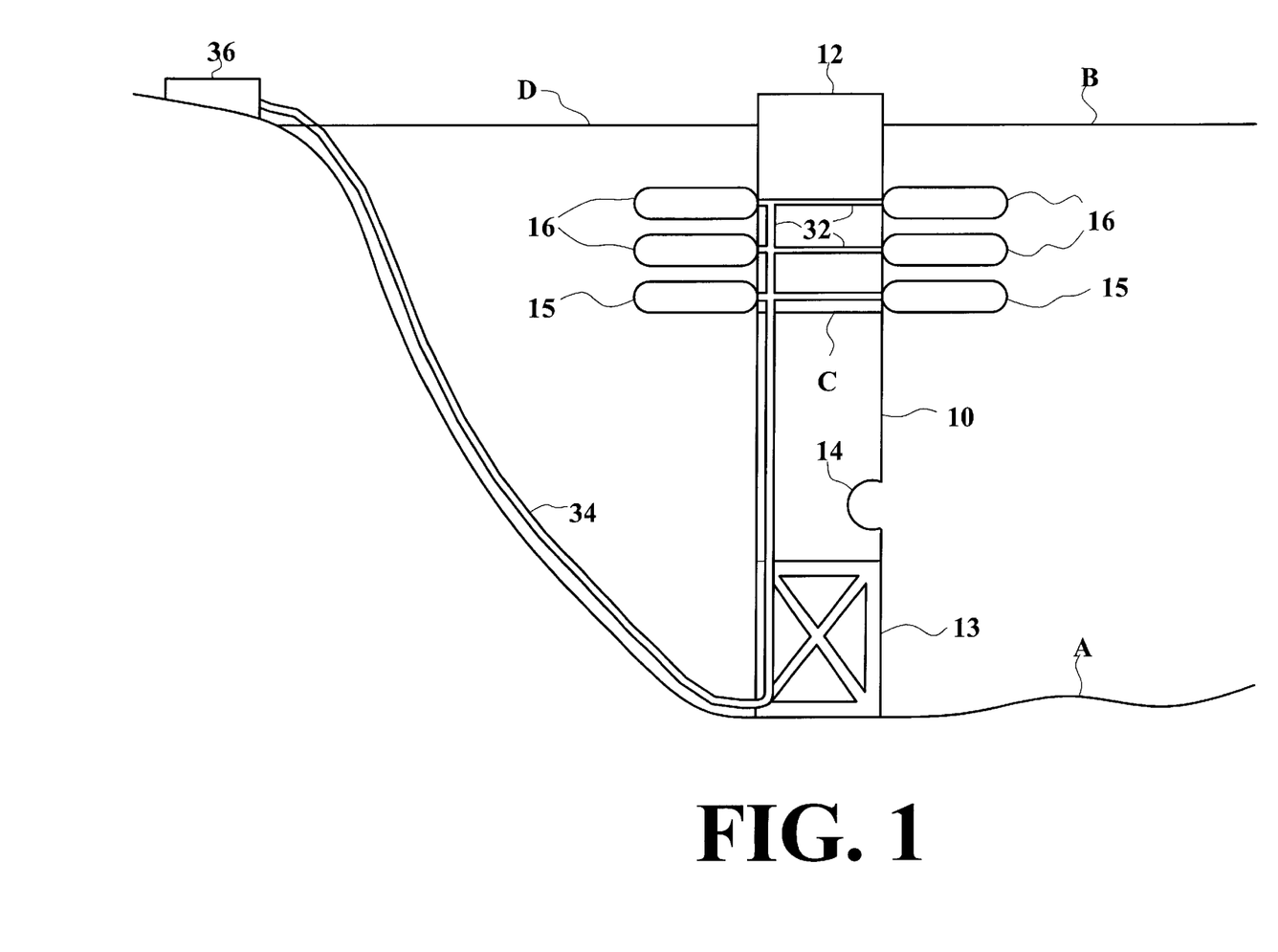
FIG. 1 is a schematic environmental front elevational view of the first preferred embodiment of the invention.

FIG. 1 is a schematic environmental front elevational view of the first preferred embodiment of the invention. A large metal cylinder 10, with an open top end 12 and an bottom opening 14, rests on platform 13 which is anchored to the floor A of the ocean B (or inland sea) offshore. (Alternatively, a tube or channel of a different shape and/or with a plurality of top openings and/or a plurality of bottom openings may be used. Also, the apparatus can be supported by flotation devices, or by cables attached to ships, rather than resting on the sea floor.) Bottom pressure hulls 15 are removably attached to the side of the cylinder, above or below the equilibrium level C of brine in the cylinder. When greater production capacity is needed, upper pressure hulls 16 are added.

Figure 2:
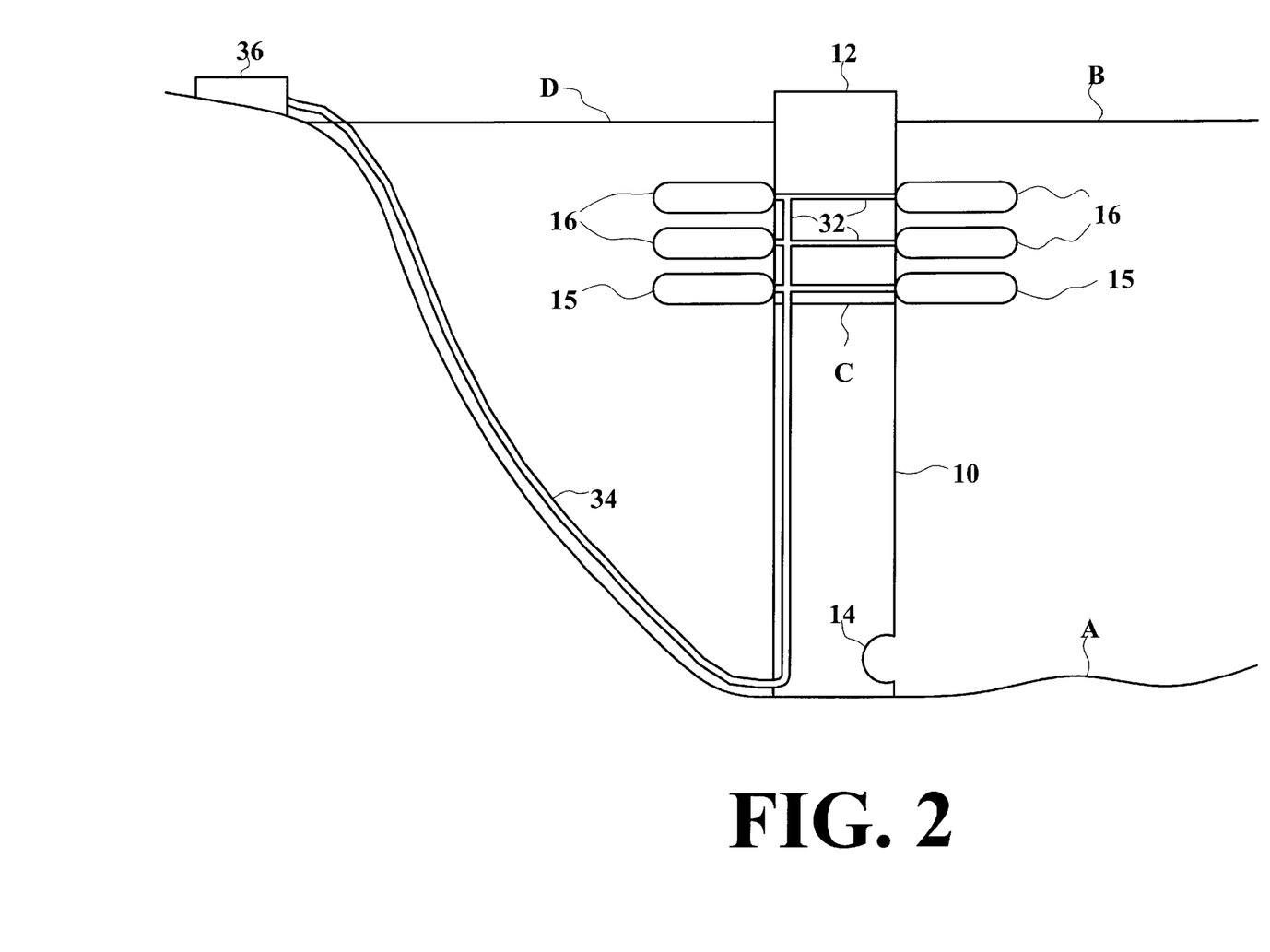
FIG. 2 is a schematic environmental front elevational view of the second preferred embodiment of the invention.

FIG. 2 is a schematic environmental front elevational view of the second preferred embodiment of the invention, which is the same as the first preferred embodiment, except that the bottom of the cylinder rests directly on the sea floor.

Figure 3:
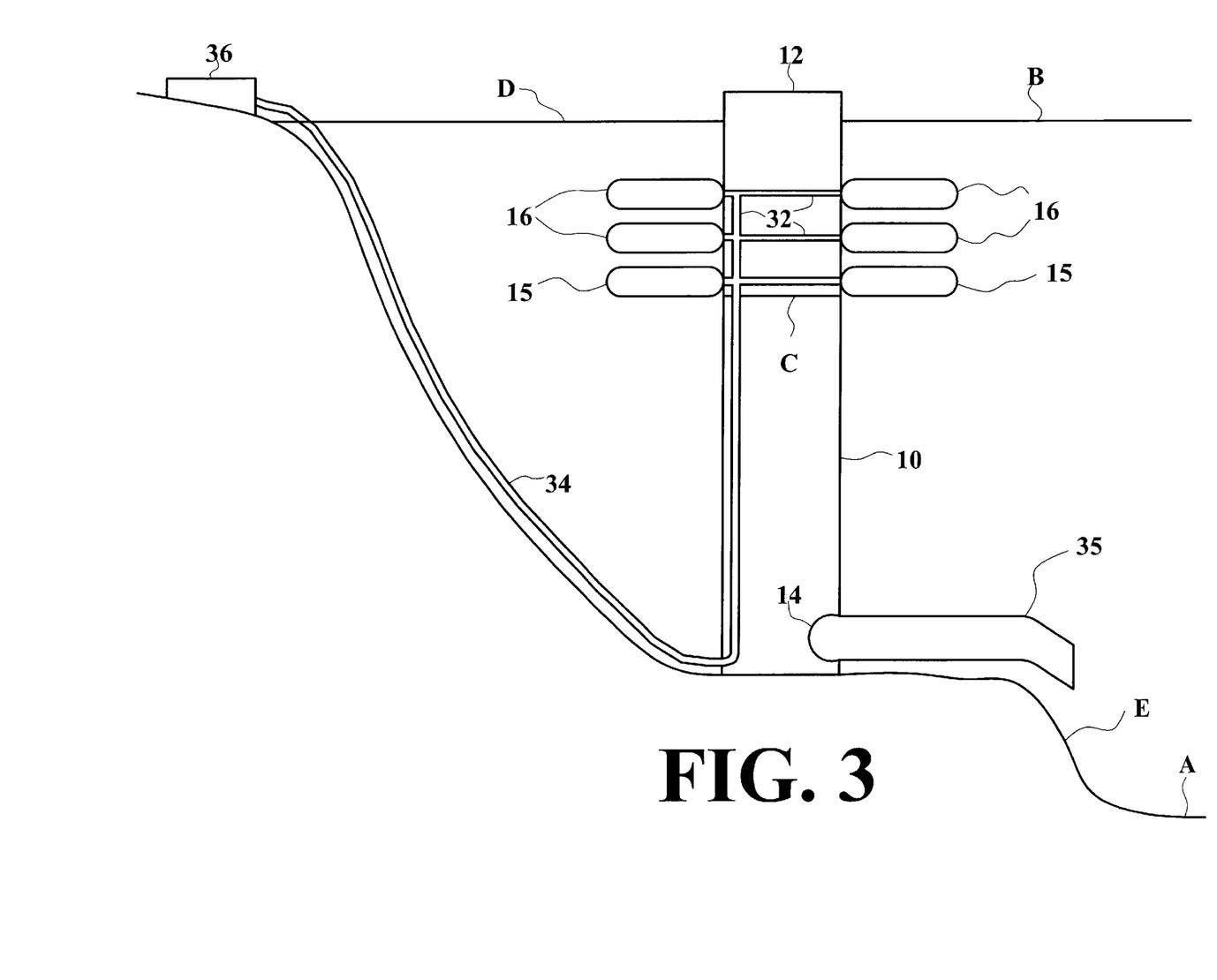
FIG. 3 is a schematic environmental front elevational view of the third preferred embodiment of the invention.

FIG. 3 is a schematic environmental front elevational view of the third preferred embodiment of the invention, which is the same as the second preferred embodiment, except that brine pipe 35 projects over a cliff E in the sea floor. This embodiment may be used in areas such as the Red Sea where the submarine topography makes it possible. Sending the brine over a submarine cliff will make possible more efficient mixing of the brine with the sea water.

Figure 4:
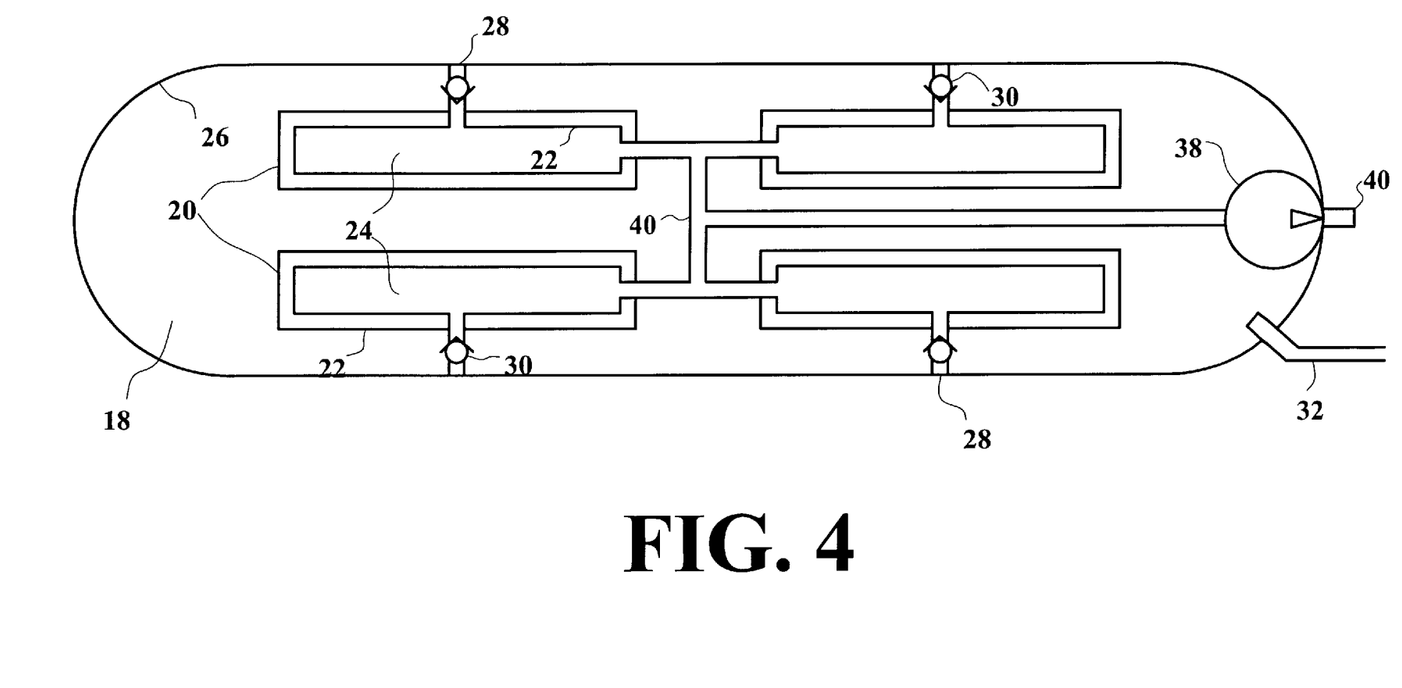
FIG. 4 is a schematic cross-sectional view of one of the pressure hulls of the first type that may be used in any of the first three preferred embodiments of the invention.

FIG. 4 is a schematic cross-sectional view of one of the pressure hulls of the first type that may be used in any of the preferred embodiments of the invention. The fresh water enclosure 18 in the interior of each pressure hull is maintained at a pressure below that of the ambient seawater, preferably at one atmosphere of pressure, but the hulls are preferably submerged at a depth at which the ambient water pressure is several atmospheres. Within each pressure hull there are several reverse osmosis devices 20 ("RODs"), each having a selectively permeable membrane 22 surrounding a brine enclosure 24. The membrane allows water molecules, but not sodium and chlorine ions, to pass through. (Other substances may also be filtered out of the seawater, depending on the characteristics of the membrane.) The pressure hulls have an external skin 26 which is impermeable to water. Seawater conduits 28, having check valves 30, pass through the external skin and the membranes, to allow seawater to pass from outside the hulls into the RODs. The check valves enhance the efficiency of the process, by preventing brine from returning directly to the surrounding seawater by the same route. The space between the external skin and the other contents of the pressure hulls forms the fresh water enclosure 18. Due to the pressure difference, water molecules pass through the membranes by reverse osmosis, and desalinated water is pumped out of the pressure hulls through the freshwater conduit 32 and (referring back to FIG. 1) pipeline 34 to an onshore storage facility 36 (or where ever else it is needed). The freshwater conduit should be external to the cylinder, as concentrated brine is highly corrosive. Freshwater pumps (not shown in the drawings) may be located in the storage facility, the pipeline, the cylinder, and/or elsewhere. The pumping out of the freshwater maintains the pressure difference across the membrane, so that reverse osmosis can continue. The desalinated water may undergo further purification at a local water treatment plant.

Figure 5:
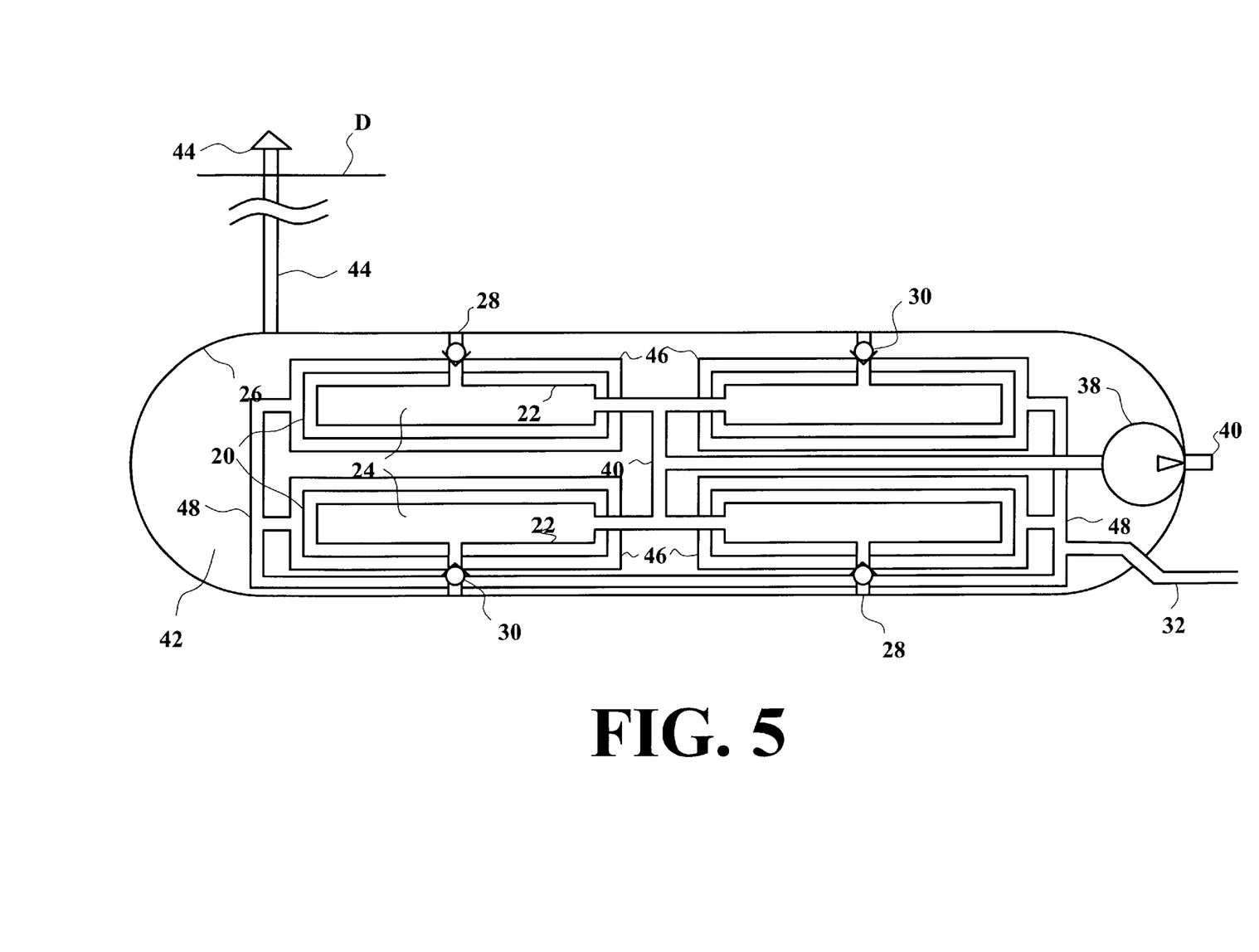
FIG. 5 is a schematic cross-sectional view of one of the pressure hulls of the second type that may be used in any of the first three preferred embodiments of the invention.

FIG. 5 is a schematic cross-sectional view of one of the pressure hulls of the second type that may be used in any of the preferred embodiments of the invention. It differs from the first type in having a dry interior 42, which is kept dry by an air vent 44 to the atmosphere above the surface D through which any moisture evaporates. The RODs are enclosed by water proof surfaces 46. Freshwater is drained from the RODs by freshwater pipes 48 which are connected to the fresh water conduit 32.

Initially, the seawater remaining on the other side of the membranes ("brine"), which has a greatly increased concentration of salt due to water passing through the membranes, is pumped into the cylinder by the brine pumps 38 through the brine conduits 40 (see FIG. 4). At least one of the brine pumps is preferably located in each pressure hull, as shown, but other locations are possible. The pumping out of the brine maintains a pressure difference across the seawater conduits, causing seawater to continue to flow into the reverse osmosis devices. After an initial surge, the level of the brine C in the cylinder will eventually reach equilibrium at an elevation below the sea level D outside the cylinder (see FIG. 1), due to the greater weight of the brine compared to unconcentrated seawater. After equilibrium is reached the pumps for the brine can be turned off, as gravity will cause it to flow down from the hulls through the bottom opening 14 of the cylinder. This will reduce the energy needed to desalinate seawater. (It will still be necessary to pump out the freshwater.) The lower pressure hulls 15 should be attached to the cylinder first, as the pressure difference will be greatest at lower depths. When greater capacity is needed, the upper hulls 16 should be added, but desalinization will not be as efficient in them, as the pressure difference will be lower.

The earth's gravity will cause the brine in the tube to flow out of the bottom opening until the weight of the brine in the tube equals the weight of an equivalent column of water in the sea outside the tube. As brine continually flows into the tube when the invention is in operation, the weight of the brine in the tube will continue to be heavier than that an equivalent column of seawater outside, and brine will continue to flow out. If there were no currents in the sea, the salinity of the sea in the immediate area around the tube could eventually rise to almost the degree of salinity in the tube (though not to complete equality, due to diffusion of salt through the seawater). This would cause the level of brine in the tube to rise to almost the level of the sea outside the tube, and it would be necessary to reactivate the brine pumps for desalinization to continue. (This might actually happen in inland bodies of salt water, which lack drainage to the oceans, if desalinization were carried out on a massive scale over a long period of time.) Thus, the present invention derives its energy savings, not out of nothing, as would a perpetual motion machine, but from the force of the earth's gravity, from ocean currents and interlayer mixing that are driven by electromagnetic radiation produced by nuclear reactions in the sun, and from diffusion made possible by random movements of molecules and ions in the seawater that are also driven by heat from the sun.

Figure 6:
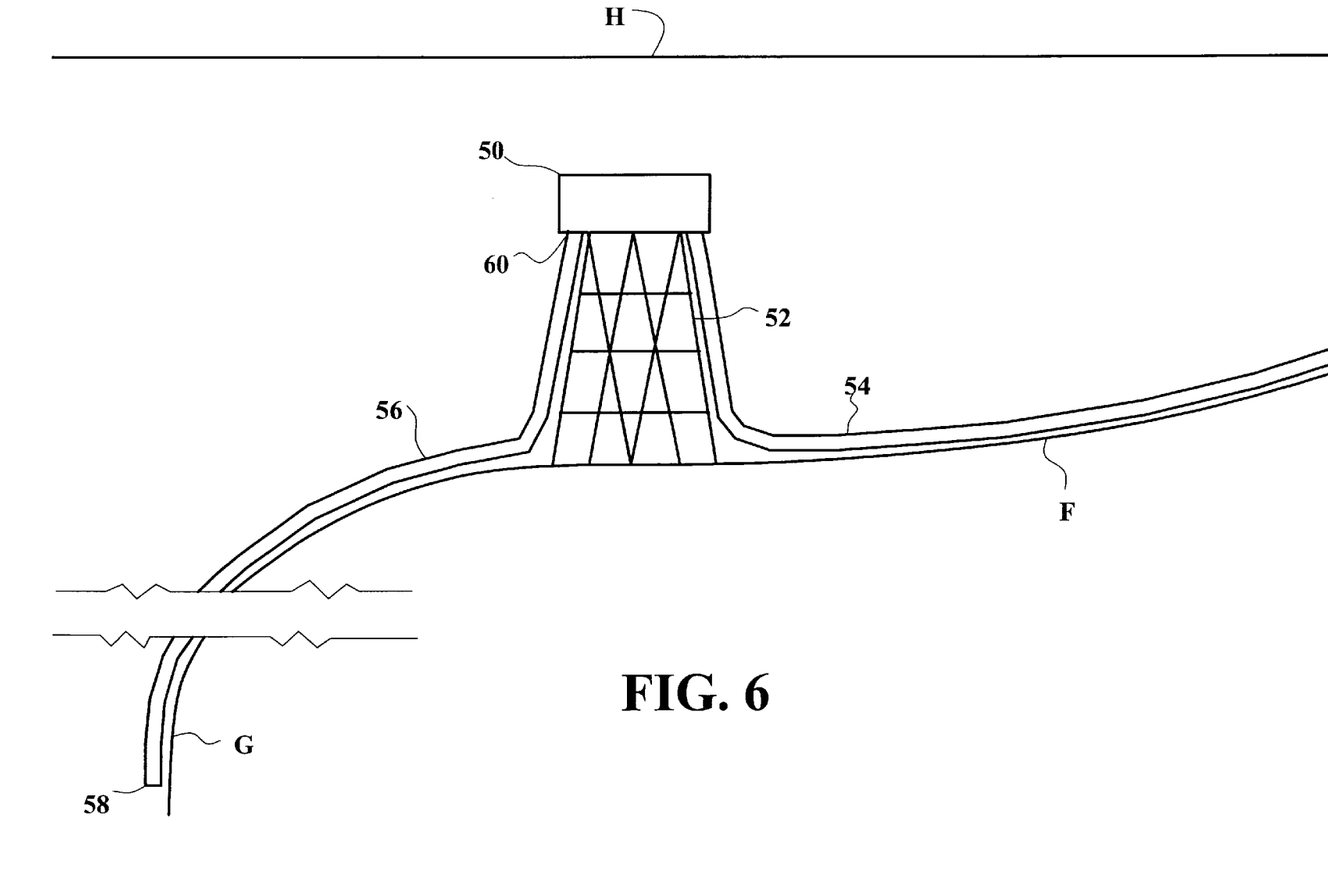
FIG. 6 is a schematic environmental front elevational view of the fourth preferred embodiment of the invention.

FIG. 6 is a schematic environmental front elevational view of the fourth preferred embodiment of the invention, in which a single reverse osmosis system 10 is elevated above the sea floor F by a platform 52. The reverse osmosis system has an external skin and contains on or more RODs (not shown in FIG. 6) which are constructed as described above. A seawater inlet (not shown in FIG. 6) allows water to pass into the reverse osmosis system after passing through a screen for fish and large matter, a prefilter for silt and particulate matter, a micro-filter for bacteria and suspended solids, and a check valve. Desalinated water is removed from the fresh water enclosures of the RODs through a fresh water return 54 by at least one fresh water pump (not shown in FIG. 6) which may be located in the reverse osmosis system, along the fresh water return, or on shore. Water having an increased concentration of salt is removed from the brine enclosures of the RODs through a brine return 56. As shown in FIG. 6, the brine return passes down the platform, over the sea floor, and has an outlet 58 where the brine is released into the surrounding seawater, preferably at a considerable distance (as indicated by the pair of jagged lines) from the reverse osmosis system (so that the brine does not soon become mixed back in with the seawater being desalinated) and over an undersea cliff G or other area of the sea floor having a lower elevation the sea floor on which the platform rests. The reverse osmosis system is located far enough below the surface of the sea H that the weight of the overlying sea water creates sufficient pressure for reverse osmosis to occur across the membranes in the RODs. A pressure differential is maintained across the membranes by the fresh water pumps. Initially, the brine is pumped out of the brine enclosures by a brine pump (not shown in FIG. 6)

until the brine return is filled (or "charged") with brine. Then the brine pump can be turned off, while the inlet 60 of the brine return remains open, and the brine will continue to flow downhill through the brine return under the force of gravity, because it is heavier than the surrounding seawater. This saves the energy that would otherwise be needed to pump out the brine. (Note that the weight of the brine in the brine return, and the drop in depth from the brine return's inlet to its outlet, must be great enough that the downward pressure of the brine under the force of gravity exceeds the back pressure across the membranes in the RODs that is maintained by the fresh water pump.)

Figure 7:
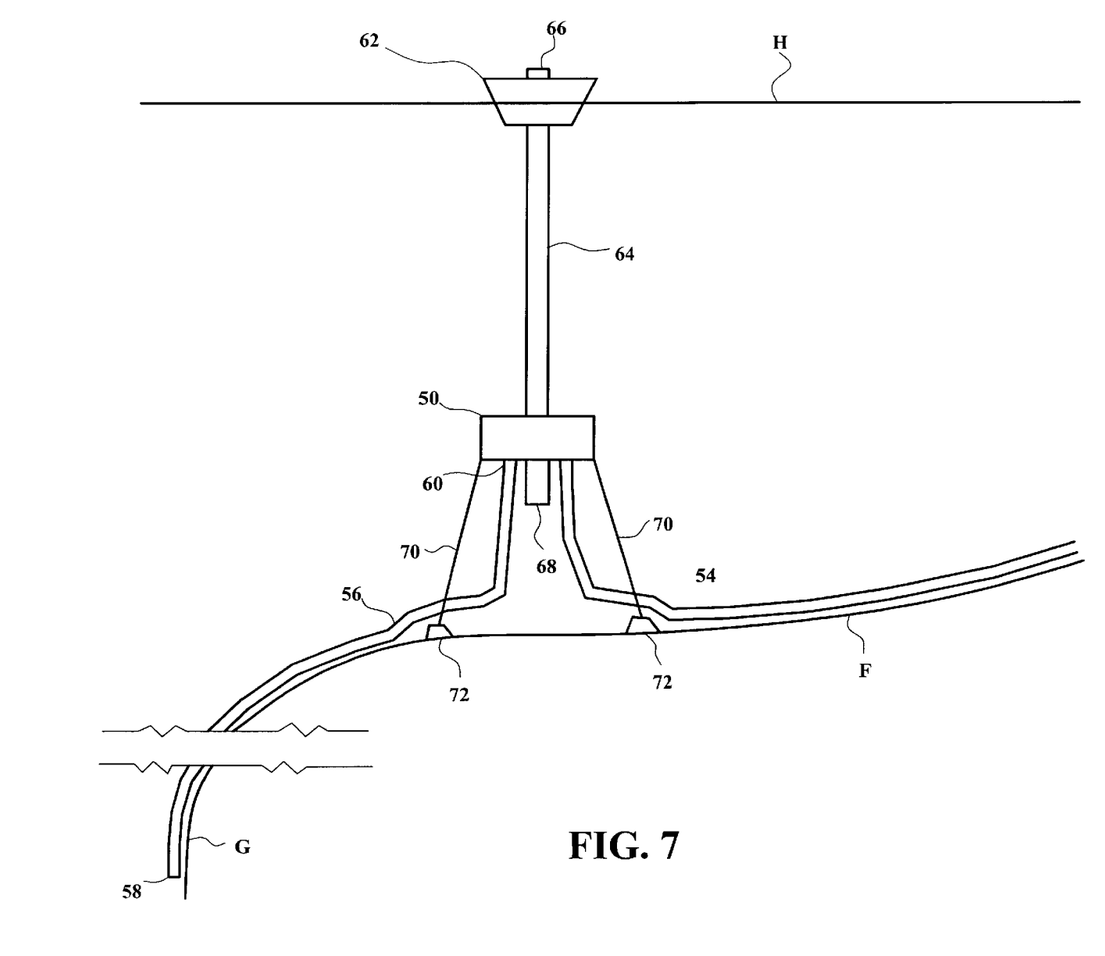
FIG. 7 is a schematic environmental front elevational view of the fifth preferred embodiment of the invention.

FIG. 7 is a schematic environmental front elevational view of the fifth preferred embodiment of the invention, which is similar to the fourth preferred embodiment, except that rather than being supported by a platform on the floor, it is supported by a flotation device 62 on the surface of the sea. A channel 64, which is preferably a hollow vertical cylinder with an open top 66 and a closed bottom 68, is retained on the flotation device, and the reverse osmosis system 50 is retained on the channel below the flotation device. The top of the channel passes above the surface of the sea. The reverse osmosis system is held in place by lines 70 connected to anchors 72 in the sea floor. Rather than being pumped directly into the brine return, brine is pumped into the channel through an outlet (not shown in FIG. 7) of the brine enclosures. The inlet of the brine return is connected to the channel, so that brine can then flow from the channel into the brine return. Once both the channel and the brine return are filled with brine, the brine pump can be turned off, while the outlet of the brine enclosures remains open, and brine will continue to flow out through the brine return, as in the fourth preferred embodiment. Because the brine is denser than the surrounding seawater, the surface of the brine in the channel will be below the surface of the sea, and it will have an increased pressure gradient (i.e., the pressure of the brine will increase more rapidly over a shorter vertical distance than the pressure of the seawater). This has the consequence that the channel can (and should) be positioned in relation to the reverse osmosis systems in such a manner that the pressure in the channel is less than the pressure in the brine enclosures in the RODs, thus causing the brine to flow out from the RODs into the channel, and from the channel out through the brine return.

It is to be understood that the present invention is not limited to the embodiments described above, but encompasses any and all embodiments within the scope of the following claims.

I claim:

1. An apparatus for desalinating seawater, comprising:
    at least one reverse osmosis device comprising at least one brine enclosure and at least one membrane through which water molecules can flow, but through which sodium and chlorine ions cannot flow, at least one of said membranes surrounding one of said brine enclosures such that water that has not passed through said at least one membrane, and has an increased concentration of salt, can be collected from said brine enclosure and separated from water having a lower concentration of salt;
    at least one fresh water enclosure, within which water that has been desalinated by passing through at least one membrane, can be collected and separated from salt water;
    a channel having at least one top opening and at least one bottom opening;
    at least one brine conduit in fluid communication with at least one brine pump for moving water having an increased concentration of salt from at least one of said brine enclosures to said channel;
    at least one pressure hull, retained on the channel and having an external skin that is impermeable to water, said external skin surrounding at least one of the brine pumps, at least one of said reverse osmosis devices, and at least one of said freshwater enclosures;
    a seawater conduit for each reverse osmosis device passing through the external skin of the pressure hull and the at least one membrane, through which seawater exterior to the pressure hull can flow into at least one brine enclosure;
    at least one check valve in at said least one seawater conduit, that prevents water from flowing from the brine enclosure back through said at least one seawater conduit; and
    at least one freshwater pump for removing desalinated water from at least one of said freshwater enclosures.

2. The apparatus for desalinating seawater according to claim 1, wherein each pressure hull has only one brine pump and only one fresh water enclosure, which is formed by the external skin, and occupies space between the external skin and the reverse osmosis devices, the internal brine conduits, and the brine pump, with a freshwater conduit passing through the external skin through which desalinated water can be pumped out.

3. The apparatus for desalinating seawater according to claim 2, wherein each reverse osmosis device is surrounded by a water proof surface connected by a freshwater pipe to a freshwater conduit passing through the external skin through which desalinated water can be pumped out.

4. The apparatus for desalinating seawater according to claim 3, wherein each pressure hull has an interior between the external skin and the water proof surfaces of the reverse osmosis devices, with the interior connected to an air vent.

5. The apparatus for desalinating seawater according to claim 4, wherein the pressure hulls are removably retained on the channel, whereby they can be temporarily removed for maintenance.

6. The apparatus for desalinating seawater according to claim 5, wherein the channel is cylindrical.

7. The apparatus for desalinating seawater according to claim 6, including a water treatment facility, to which the desalinated water is pumped out for further purification.

8. A desalinization system located within a body of seawater, comprising:
    at least one brine channel having an open top end extending above an upper surface of said body of seawater and a bottom opening for discharging water having an increased concentration of salt into said body of seawater;
    a pressure hull surrounding a reverse osmosis device having a membrane surrounding a brine chamber, said pressure hull being retained upon a side of said brine channel at a depth below the upper surface of said body of sea water;
    a seawater conduit having a check valve, said seawater conduit passing through said pressure hull and said membrane;
    a brine pump for pumping brine to said brine channel; and
    a freshwater conduit connected to a pump for removing fresh water from a permeate side of said membrane, the permeate side of the membrane being opposite a side of the membrane in contact with brine in the brine chamber.

* * * * *